United States Patent
Oh

(10) Patent No.: US 9,524,076 B2
(45) Date of Patent: Dec. 20, 2016

(54) WEB PAGE MANAGEMENT METHOD AND APPARATUS AND STORAGE MEDIUM THEREOF

(75) Inventor: Chang-seok Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 958 days.

(21) Appl. No.: 13/115,695

(22) Filed: May 25, 2011

(65) Prior Publication Data

US 2011/0296323 A1 Dec. 1, 2011

(30) Foreign Application Priority Data

May 25, 2010 (KR) .................. 10-2010-0048619

(51) Int. Cl.
*G06F 3/0482* (2013.01)
*G06F 17/30* (2006.01)

(52) U.S. Cl.
CPC ....... *G06F 3/0482* (2013.01); *G06F 17/30899* (2013.01)

(58) Field of Classification Search
CPC ................................ G06F 3/01; G06F 15/173
USPC ................. 715/760, 762, 763, 764
See application file for complete search history.

(56) References Cited

U.S. PATENT DOCUMENTS

| | | | | |
|---|---|---|---|---|
| 6,037,934 A * | 3/2000 | Himmel | ........... | G06F 17/30884 707/E17.114 |
| 6,643,641 B1 * | 11/2003 | Snyder | .............. | G06F 17/30864 707/709 |
| 7,464,076 B2 * | 12/2008 | Eiron | ............... | G06F 17/30864 |
| RE42,413 E * | 5/2011 | Snyder | .............. | G06F 17/30864 707/770 |
| 7,945,668 B1 * | 5/2011 | Nucci | .................. | G06N 99/005 707/999.001 |
| 8,245,151 B2 * | 8/2012 | Selig | ..................... | G06F 17/243 715/781 |
| 8,473,574 B2 * | 6/2013 | Kong | ................ | G06F 17/30781 707/706 |
| 2005/0086597 A1 * | 4/2005 | Duperrouzel | ..... | G06F 17/30905 715/273 |
| 2005/0256887 A1 * | 11/2005 | Eiron | ................ | G06F 17/30958 |
| 2008/0005686 A1 * | 1/2008 | Singh | .................. | G06F 3/04842 715/764 |
| 2008/0184158 A1 * | 7/2008 | Selig | ..................... | G06F 17/243 715/781 |
| 2008/0215416 A1 * | 9/2008 | Ismalon | ............ | G06F 17/30867 705/14.54 |
| 2009/0019354 A1 * | 1/2009 | Jaiswal | ............... | G06F 17/3089 715/224 |
| 2009/0253978 A1 * | 10/2009 | Hashimshony | .......... | A61B 5/05 600/407 |

(Continued)

FOREIGN PATENT DOCUMENTS

| | | |
|---|---|---|
| JP | 2009/048333 | 3/2009 |
| JP | 2009-140473 | 6/2009 |

OTHER PUBLICATIONS

Korean Office Action dated Mar. 7, 2016 issued in counterpart application No. 10-2010-0048619, 13 pages.

*Primary Examiner* — David Choi

(74) *Attorney, Agent, or Firm* — The Farrell Law Firm, P.C.

(57) ABSTRACT

A web page management method and apparatus are provided in which a selection signal is received for a plurality of web pages, and identification information is received. The plurality of web pages are grouped and managed based on the identification information.

19 Claims, 12 Drawing Sheets

(56) References Cited

U.S. PATENT DOCUMENTS

| | | | | |
|---|---|---|---|---|
| 2009/0287683 A1* | 11/2009 | Bennett | ............ | G06F 17/30867 |
| 2009/0327947 A1* | 12/2009 | Schreiner | .............. | G06F 3/0483 |
| | | | | 715/777 |
| 2010/0050068 A1* | 2/2010 | Usami | ............... | G06F 17/30884 |
| | | | | 715/206 |
| 2010/0138757 A1* | 6/2010 | Shigenobu | ......... | H04N 1/00411 |
| | | | | 715/760 |
| 2011/0119267 A1* | 5/2011 | Forman | .................. | G06Q 30/00 |
| | | | | 707/737 |
| 2011/0167063 A1* | 7/2011 | Tengli | ............... | G06F 17/30834 |
| | | | | 707/737 |
| 2011/0208732 A1* | 8/2011 | Melton | ............ | G06F 17/30896 |
| | | | | 707/728 |
| 2011/0252060 A1* | 10/2011 | Broman | ............ | G06F 17/30899 |
| | | | | 707/771 |
| 2011/0252329 A1* | 10/2011 | Broman | ............ | G06F 17/30876 |
| | | | | 715/738 |
| 2011/0252342 A1* | 10/2011 | Broman | ............ | G06F 17/30899 |
| | | | | 715/760 |
| 2011/0289182 A1* | 11/2011 | Kong | ............... | G06F 17/30864 |
| | | | | 709/217 |
| 2011/0296323 A1* | 12/2011 | Oh | .................... | G06F 17/30899 |
| | | | | 715/760 |

\* cited by examiner

WEB PAGE MANAGEMENT METHOD AND APPARATUS AND STORAGE MEDIUM THEREOF

PRIORITY

This application claims priority under 35 U.S.C. §119(a) to Korean Patent Application No. 10-2010-0048619, filed on May 25, 2010, in the Korean Intellectual Property Office, the disclosure of which is incorporated herein by reference.

BACKGROUND OF THE INVENTION

1. Field of the Invention

The present invention relates generally to web page management, and more particularly, to a method of managing a plurality of web pages, an apparatus capable of performing the method, and a storage medium thereof.

2. Description of the Related Art

A user may visit a large number of web pages when web browsing for a long period of time. Of the web pages that the user visited, there may be a large number of web pages that are correlated. However, when the number of visited web pages is large, searching the visited web pages again based on the correlation may be difficult.

A tab browsing technique exists that shows a plurality of web pages in a single web browser window. The tab browsing generates a plurality of tabs in a single web browser window and shows the plurality of web pages by assigning one web page per tab.

However, a tab browsing based browser function is performed in units of web pages. For example, browser functions such as web page opening, web page closing, web page display position movement, and bookmark registration and deletion, are performed in units of web pages according to selection of a tab.

Although the tab browsing shows a plurality of web pages based on a tab in a single web browser window, the tab browsing based browser function is not performed based on a correlation between tabs. Although web pages included in a single web browser window are correlated with each other, the tab browsing based browser function is performed in units of web pages.

When a plurality of correlated web pages are searched again, a user needs to check the contents of the web page by selecting each tab generated in a web browser window. Thus, accessibility to a web page when the tab browsing based browser function is performed is not significantly different from accessibility to a web page when a browsing based browser function that shows a single web page in a single web browser window is performed.

SUMMARY OF THE INVENTION

The present invention has been made to address at least the above problems and/or disadvantages and to provide at least the advantages described below. Accordingly, an aspect of the present invention provides a web page management method that provides easy access to a plurality of correlated web pages, an apparatus having a browser function that can perform the method, and a computer readable storage medium having recorded thereon a program for executing the method.

According to an aspect of the present invention, a method of managing a web page is provided. A selection signal is received for a plurality of web pages. Identification information is received. The plurality of pages are grouped and managed based on the identification information.

A browser function may be performed with respect to the grouped plurality of web pages based on the identification information in a same manner as a browser function with respect to a single web page, when the identification information is received after the plurality of web pages are grouped.

The grouped plurality of web pages may be simultaneously activated based on the identification information when the identification information is received after the plurality of web pages are grouped. The grouped plurality of web pages may be simultaneously closed when a page closing signal is received.

A browser function may be performed with respect to the grouped plurality of web pages in a same manner as a browser function with respect to a single web page until the page close signal is received.

According to another aspect of the present invention, an apparatus is provided that includes a user interface unit for inputting a signal and outputting a web page. The apparatus also includes a processor for receiving a selection signal for a plurality of web pages and identification information through the user interface unit, and grouping and managing the plurality of web pages based on the identification information. Additionally, the apparatus includes a storage unit for storing the identification information and information on the plurality of web pages.

According to a further aspect of the present invention, a computer readable recording medium is provided having recorded thereon a program, which when executed implements the steps of receiving a selection signal for a plurality of web pages, receiving identification information, and grouping and managing the plurality web pages based on the identification information.

BRIEF DESCRIPTION OF THE DRAWINGS

The above and other aspects, features and advantages of the present invention will become more apparent from the following detailed description when taken in conjunction with the accompanying drawings. in which.

DETAILED DESCRIPTION OF EMBODIMENTS OF THE PRESENT INVENTION

Figure 1:
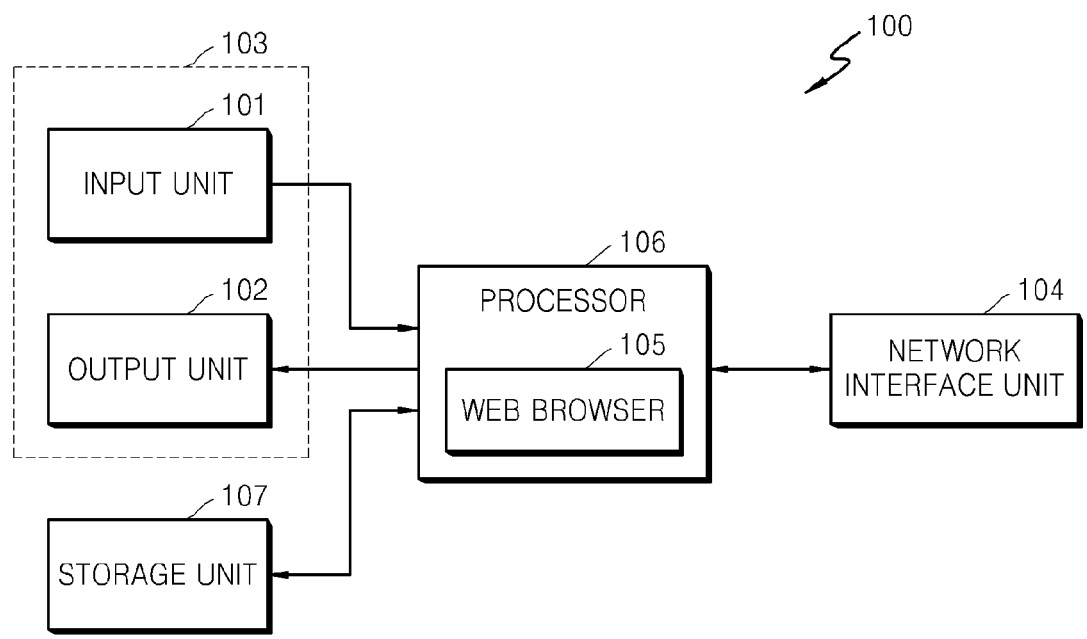
FIG. 1 is a functional block diagram illustrating an apparatus having a browser function, according to an embodiment of the present invention.

Embodiments of the present invention are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present invention.

FIG. 1 is a functional block diagram illustrating an apparatus 100 having a browser function or a web browser, according to an embodiment of the present invention. The apparatus 100 may be an apparatus on which a web browser is mounted, such as, for example, a Personal Computer (PC), an Internet Protocol TeleVision (IPTV), or a mobile device, but the apparatus is not limited thereto. The mobile device may include a mobile phone, an MP3 player, a navigation system, or a Personal Digital Assistant (PDA), but the mobile device is not limited thereto. Referring to FIG. 1, the apparatus 100 includes an input unit 101, an output unit 102, a network interface unit 104, a processor 106 including a web browser 105, and a storage unit 107. The web browser 105 may be referred to as a browser herein.

The input unit 101 may input a signal such as, for example, a touch based signal, a key based signal, a mouse operation based signal, or a remote controller operation based signal. The output unit 102 may output at least an image signal. The input unit 101 and the output unit 102 may be defined as a user interface 103 that may input a signal and output an image such as a web page. Accordingly, in embodiments of the present invention, signals input through the input unit 101 may be interpreted as signals input through the user interface 103, and signals output through the output unit 102 may be interpreted as signals output through the user interface 103.

When the user interface 103 is a touch panel based user interface, the input unit 101 may be defined as a touch panel and the output unit 102 may be defined as a display device. When the output unit 102 is a display device, the output unit 102 may be a display device such as a Liquid Crystal Display (LCD), a Light-Emitting Diode (LED), or a Cathode Ray Tube (CRT). However, the input unit 101 and the output unit 102 are not limited to the above descriptions. For example, the output unit 102 may output both an image signal and a voice signal.

According to an embodiment of the present invention, the input unit 101 may input a web page grouping start signal, a web page grouping end signal, a web browsing end signal, group identification information, a group identification information based web browser function control signal, a group identification information based web browser function control end signal, and a web browser function control signal.

The web browser function control signal may include, for example, signals for controlling page closing, bookmark registration or addition, update or renewal, or display position movement on a screen. However, the web browser function control signal is not limited thereto. The web browser function control signal may be used to control a web browser function for grouped web pages.

A signal output from the output unit 102 may include a web page. The web page is an electronic document prepared by web technology, such as, HyperText Markup Language (HTML), JavaScript, or Cascading Style Sheet (CSS), and may follow a standard specification set by the World Wide Web Consortium (W3C), but the web page is not limited thereto.

The network interface unit 104 enables data communications between the apparatus 100 and a network such as the Internet. Data communicated by the network interface unit 104 may include web data that may form a web page.

The processor 106 is a processor for controlling all functions of the apparatus 100 and may be defined to be a controller or a microprocessor. However, the processor is not limited thereto. The processor 106 may operate based on the web browser 105 that is loaded therein. Thus, the operation of the processor 106 may be interpreted as an operation of the web browser 105. Although FIG. 1 illustrates that the processor 106 includes the web browser 105, the web browser 105 may be stored in the storage unit 107 and used by the processor 106.

Figure 2:
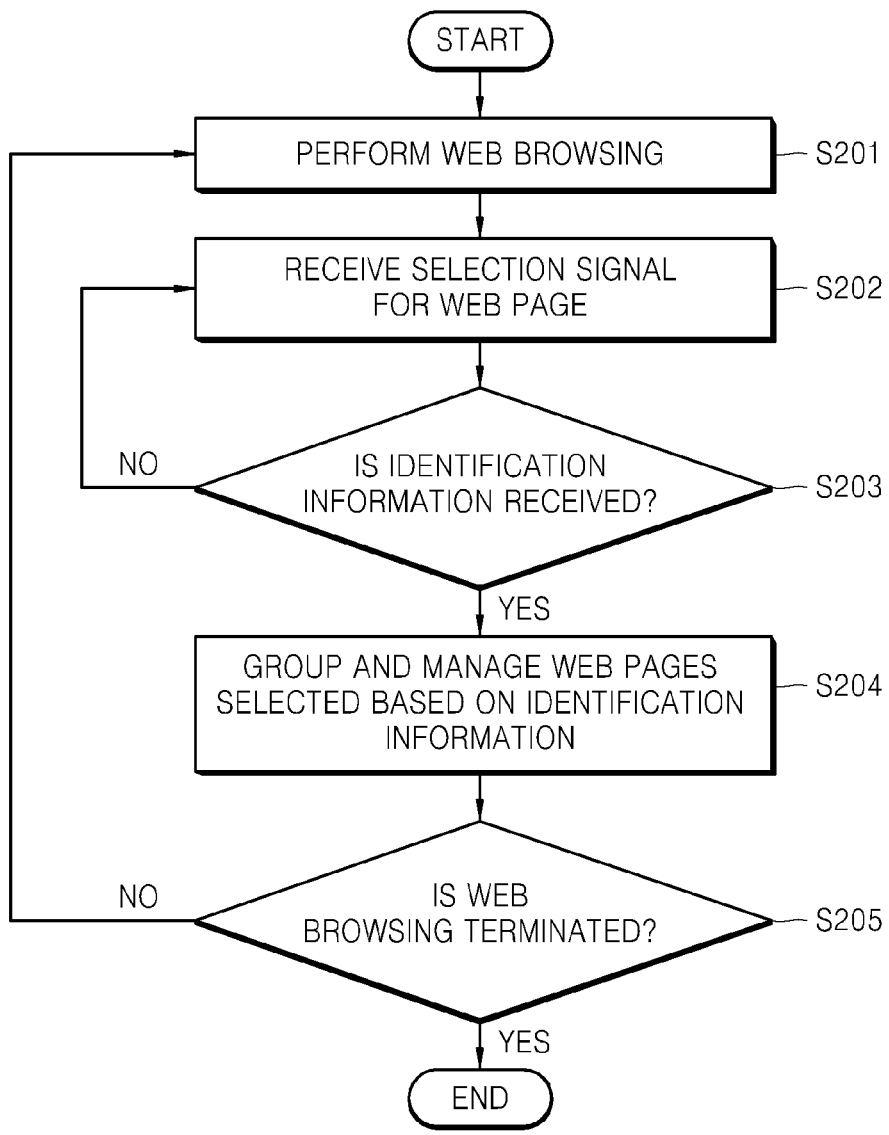
FIG. 2 is a flowchart illustrating a web page management method, according to an embodiment of the present invention.

The processor 106 may operate based on the web browser 105 that is loaded therein, as illustrated in FIG. 2. FIG. 2 is a flowchart illustrating a web page management method, according to an embodiment of the present invention.

Referring to FIG. 2, the processor 106 performs web browsing based on the web browser 105 that is loaded therein, in step S201. During web browsing, the processor 106 receives a selection signal for a web page through the input unit 101, in step S202.

Figure 3:
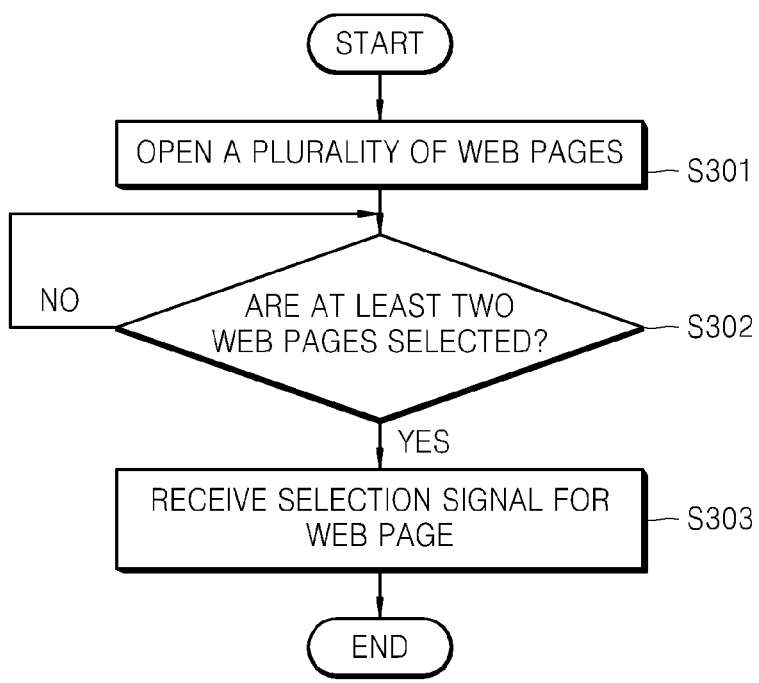
FIG. 3 is a flowchart illustrating an operation of receiving a selection signal for a web page, according to an embodiment of the present invention.

The selection signal for the web page may be received based on web pages open on the output unit 102. FIG. 3 is a flowchart illustrating an operation of receiving a selection signal for a web page based on the open web pages, according to an embodiment of the present invention.

Referring to FIG. 3, a plurality of web pages are open on the output unit 102 by web browsing, in step S301, and corresponding step S201 of FIG. 2. It is determined whether at least two web pages of the open web pages are selected (or designated) by the input unit 101, in step S302. When at least two web pages are selected, the processor 106 receives a selection signal for the selected web page, in step S303. The processor 106 selects web pages to be grouped from the open web pages according to the received selection signal.

The selection of web pages is performed by a user in step S302. The web pages to be grouped may be dynamically selected by the user. The web pages selected in step S302 may be correlated web pages or web pages having a correlation determined by the user. The number of web pages that may be selected in step S302 may be not greater than the number of the open web pages. In FIG. 3, a start operation may be defined as step S201 of FIG. 2, and an end operation may be defined to be defined as step S203 of FIG. 2. The operations S302 and S303 may be repeatedly performed in units of web pages.

Specifically, when one web page is selected in step S302, reception of a selection signal for the web page selected in step S303 may be repeatedly performed until the selection of all web pages to be grouped is completed.

Figure 4:
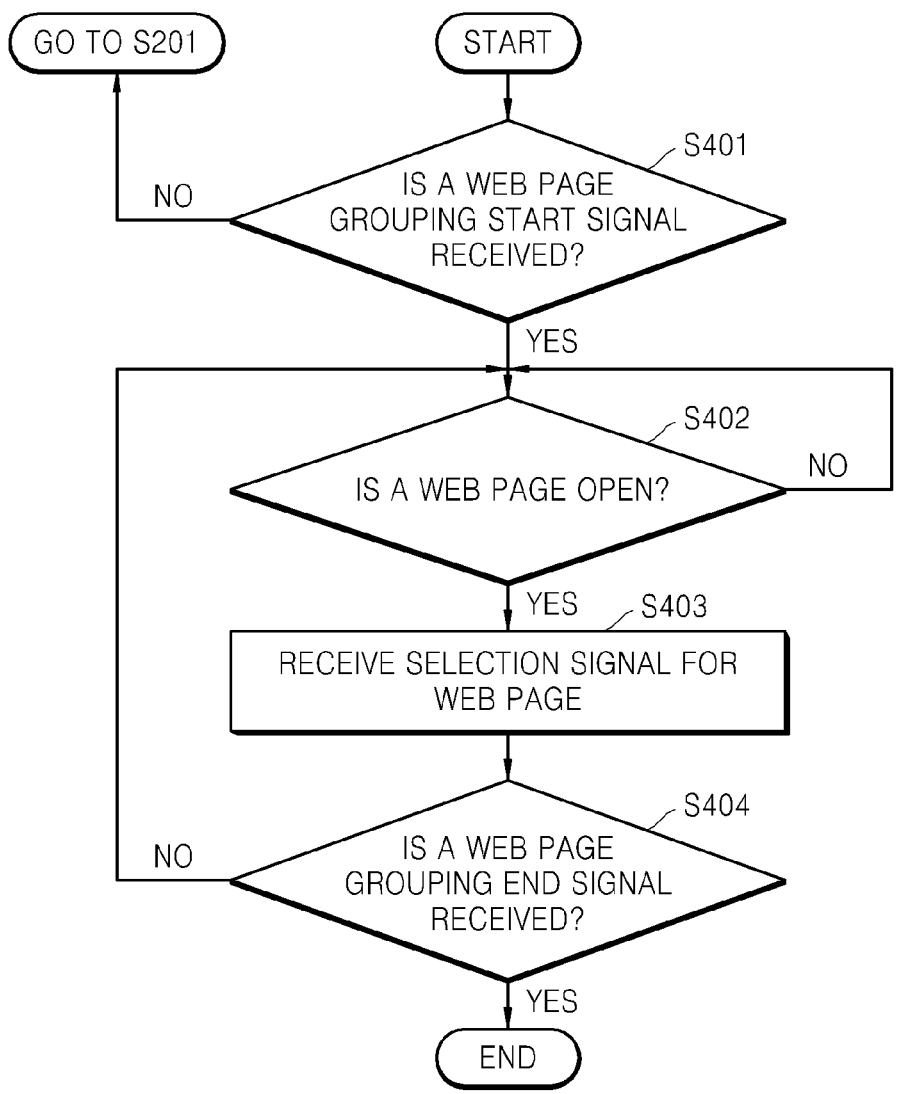
FIG. 4 is a flowchart illustrating an operation of receiving a selection signal for a web page, according to another embodiment of the present invention.

The selection signal for a web page in step S202 of FIG. 2 may be received based on a web page grouping start signal and a web page grouping end signal. FIG. 4 is a flowchart illustrating an operation of receiving a selection signal for a web page, based on a web page grouping start signal and a web page grouping end signal, according to an embodiment of the present invention.

Referring to FIG. 4, during web browsing in step S201, a web page grouping start signal is received through the input unit 101, in step S401. When it is determined that a web page is open in step S402, the processor 106 receives a selection signal for the open web page in step S403. When a web page grouping end signal is received through the input unit 101 in step S404, the processor 106 terminates the operation in FIG. 4.

When the web page grouping end signal is not received in step S404, the processor 106 monitors whether a web page is open in step S402 and repeatedly performs the above process until the web page grouping end signal is received. Specifically, after the web page grouping start signal is received, the processor 106 receives a web page selection signal whenever a web page is open until the web page grouping end signal is received. The processor 106 selects web pages to be grouped, according to a received selection signal. After a web page grouping start signal is received, all open web pages may be managed as one group until a web page grouping end signal is received.

In FIG. 4, a start operation may be defined as step S201 of FIG. 2 and an end operation may be defined as step S203 of FIG. 2.

Referring back to FIG. 2, when identification information is received in step S203, the processor 106 manages web pages by grouping the web pages selected according to the selection signal received in step S202 based on the received identification information, in step S204. However, when the identification information is not received in step S203, the processor 106 returns to step S202 and continuously performs the operation of receiving a selection signal for a web page to be grouped.

The identification information is based on correlation between web pages to be grouped and may be used as information for identifying a web page group. The identification information may be used during a search for a web page group and may be determined according to a preference of a user. Accordingly, as described above, the web pages selected according to the selection signal in the operation S202 may be correlated. However, even when the web pages are not correlated, the web pages may be defined as web pages having a correlation based on the preference of a user. Information such as a subject word determined according to the preference of the user, a keyword or a search word used for searching a web page, a word indicating purpose of grouping, or information based on correlation between web pages may be used as the identification information.

For example, when a user performs web browsing using a search word "Samsung" in step S201 and the web pages visited by the user are web pages found using the search word "Samsung", the selection signal received in step S202 is a selection signal for the web pages found using the search word "Samsung". Thus, the web pages selected according to the selection signal received in step S202 are web pages having correlation in terms of "Samsung" so that the identification information received in step S203 may be "Samsung".

However, when the web pages opened during web browsing in step S201 are not correlated and a web page selection signal is received in step S202, the selection signal received in step S202 is a selection signal for web pages having no correlation. However, identification information indicating a user's purpose of grouping the selected web pages may be received in step S203. When the identification information indicating the user's purpose of grouping is received in step S203, the web pages grouped in step S204 may be defined as web pages having a correlation according to the user's purpose of grouping. The identification information may be information based on a correlation between web pages according to the user's purpose of grouping.

When some of the web pages opened during web browsing in step S201 are correlated and a selection signal for web pages having partial correlation in step S202 is received, identification information based on correlation between web pages or identification information determined according to the taste of a user may be received in step S203.

In step S204, the processor 106 may store the identification information received from the input unit 101 and information on the selected web page in the storage unit 107. The information on the web page stored in the storage unit 107 may include information used to identify a web page, for example, a web address of each web page. The information on the web page stored in the storage unit 107 may be used when the web pages grouped based on the identification information is searched for. The web address may be defined as a Universal Resource Locator (URL).

When the information on the web page is a web address, in step S203, the identification information received from the input unit 101 is defined to be first identification information and information on each web page may be defined to be second identification information. When the information stored in the storage unit 107 is defined as the first and second identification information, grouping information on the web page stored in the storage unit 107 may be defined to have a data structure including a first identification information field and a second identification information field. The identification information received from the input unit 101 and the information on the selected web page may be temporarily kept and managed by the processor 106.

When a web browsing end signal is received through the input unit 101 in step S205, the processor 106 terminates web browsing. Otherwise, the processor 106 returns to step S201 and continuously performs web browsing according to a signal input through the input unit 101. In the flowchart of FIG. 2, step S205 may be omitted.

As described above, the processor 106 may manage a plurality of web pages by grouping the web pages using single identification information. A group generated by the grouping of web pages may be defined as a web page group. A plurality of web page groups may be generated through the above-described processes. The web page groups may be managed based on the identification information used for grouping. The management of the web page groups may be performed by the processor 106 and related information may be stored in the storage unit 107. When a plurality of web page groups are generated, the storage unit 107 may store identification information of each of the web page groups and information on each web page.

Figure 5:
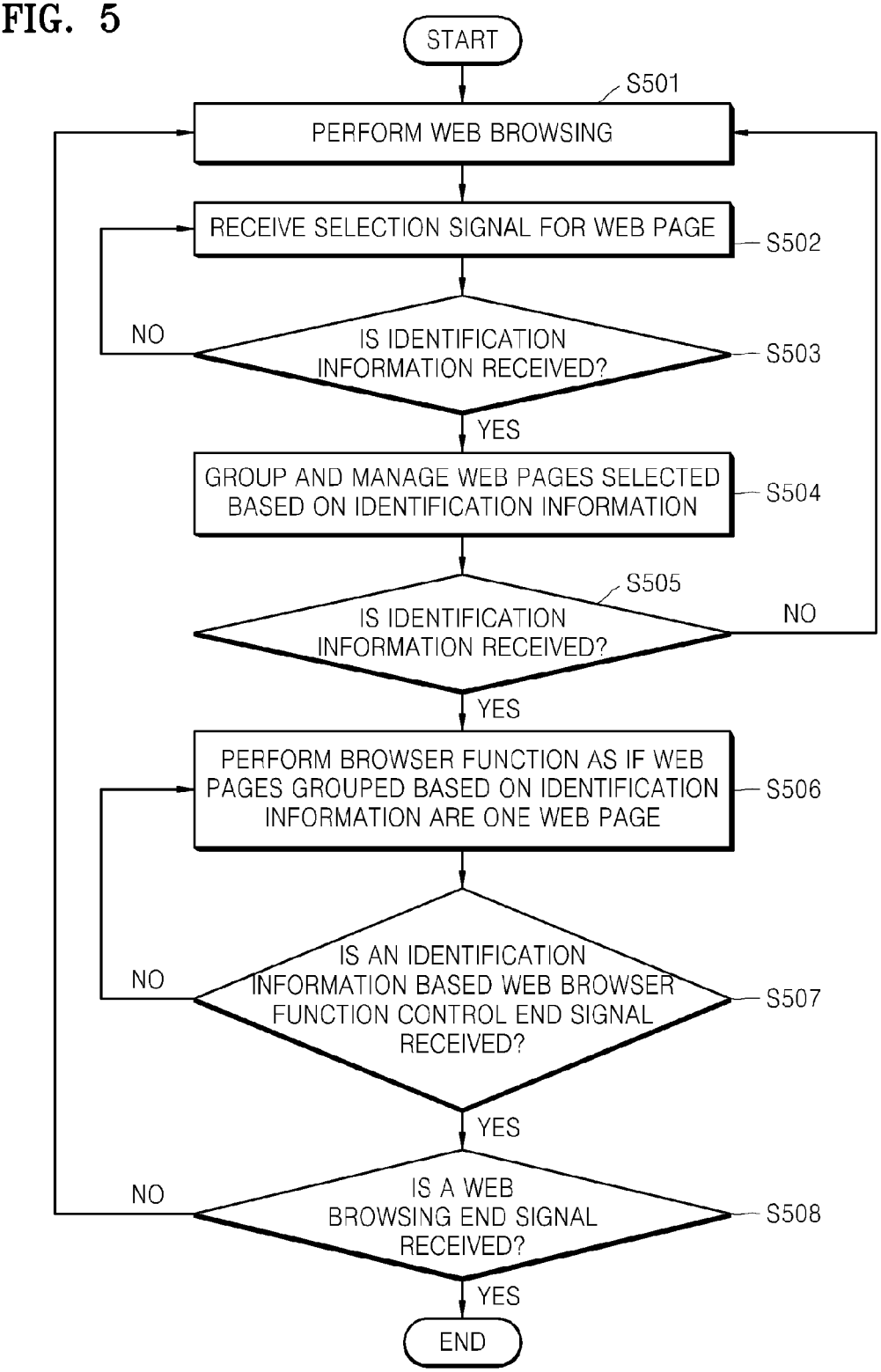
FIG. 5 is a flowchart illustrating a web page management method, according to another embodiment of the present invention.

The processor 106 may perform a web page management method based on the web browser 105 that is loaded, as explained in FIG. 5. FIG. 5 is a flowchart illustrating a web page management method, according to another embodiment of the present invention.

In FIG. 5 a web browser function based on identification information used for grouping of web pages is added to the embodiment of FIG. 2. Thus, steps S501 through S504, and S508 of FIG. 5 are the same as steps S201 through S205, and are described above with respect to FIG. 2.

When identification information is received through the input unit 101 in step S505, the processor 106 performs a web browser function for web pages grouped based on the identification information received, in step S506, like a web browser function for a single web page.

Specifically, the processor 106 reads information on the grouped web pages stored in the storage unit 107 based on the received identification information, and searches for the grouped web pages using information on each web page and simultaneously activates or opens the grouped web pages.

Figure 6:
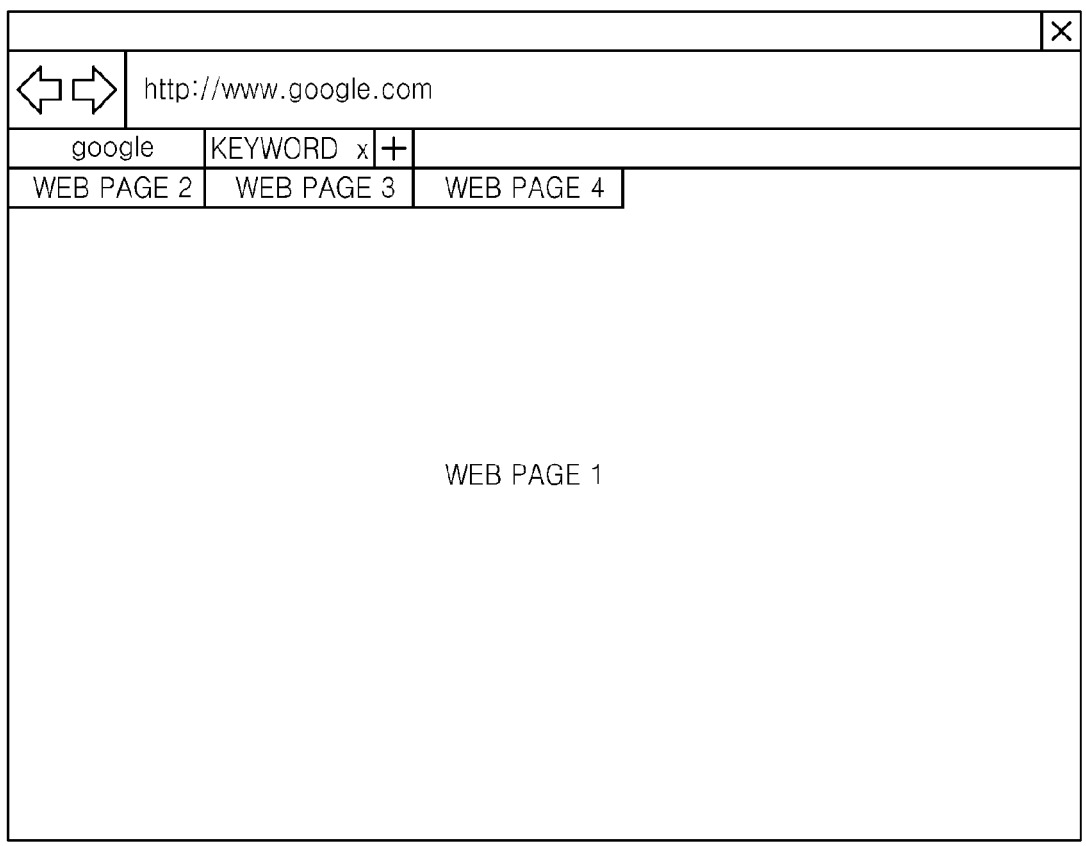
FIGS. 6-9 illustrate activation of grouped web pages, according to embodiments of the present invention.
Figure 7:
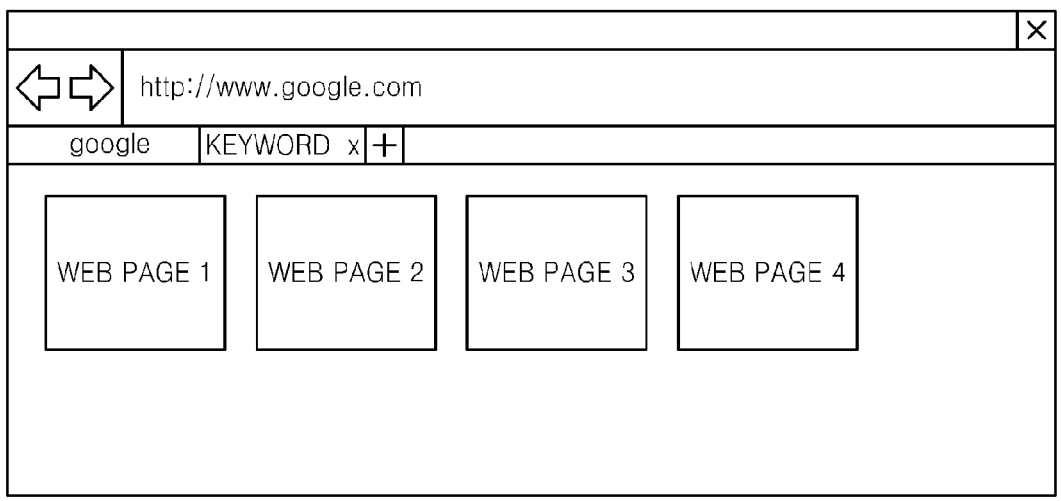
Figure 8:
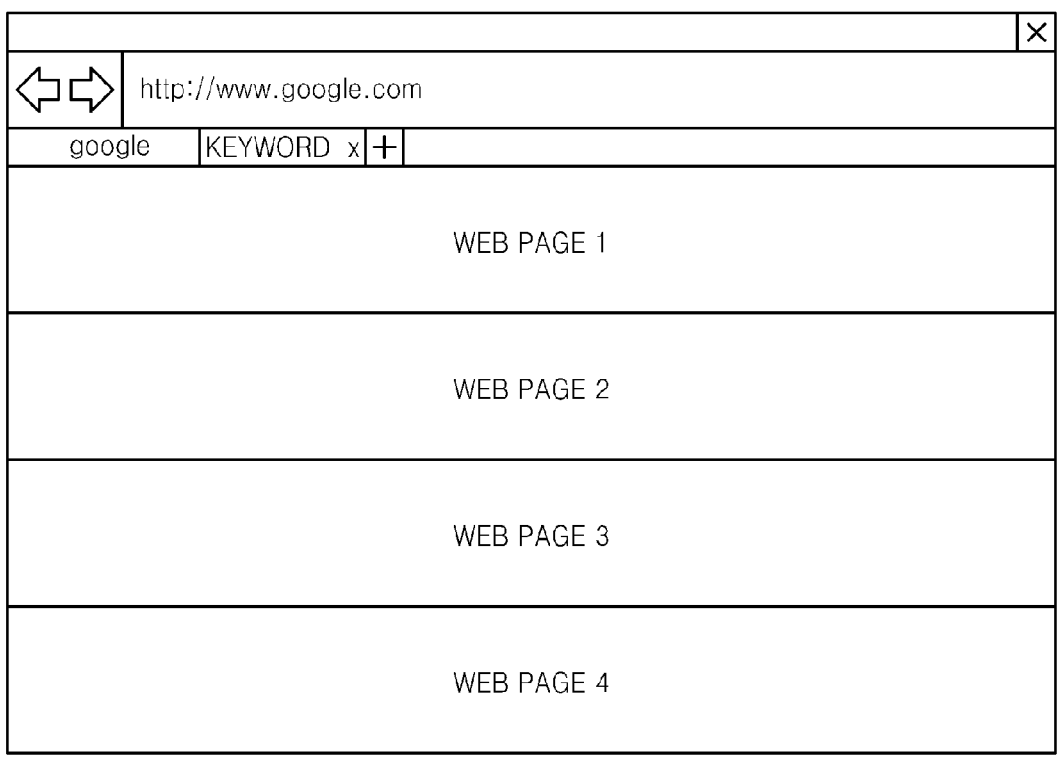
Figure 9:
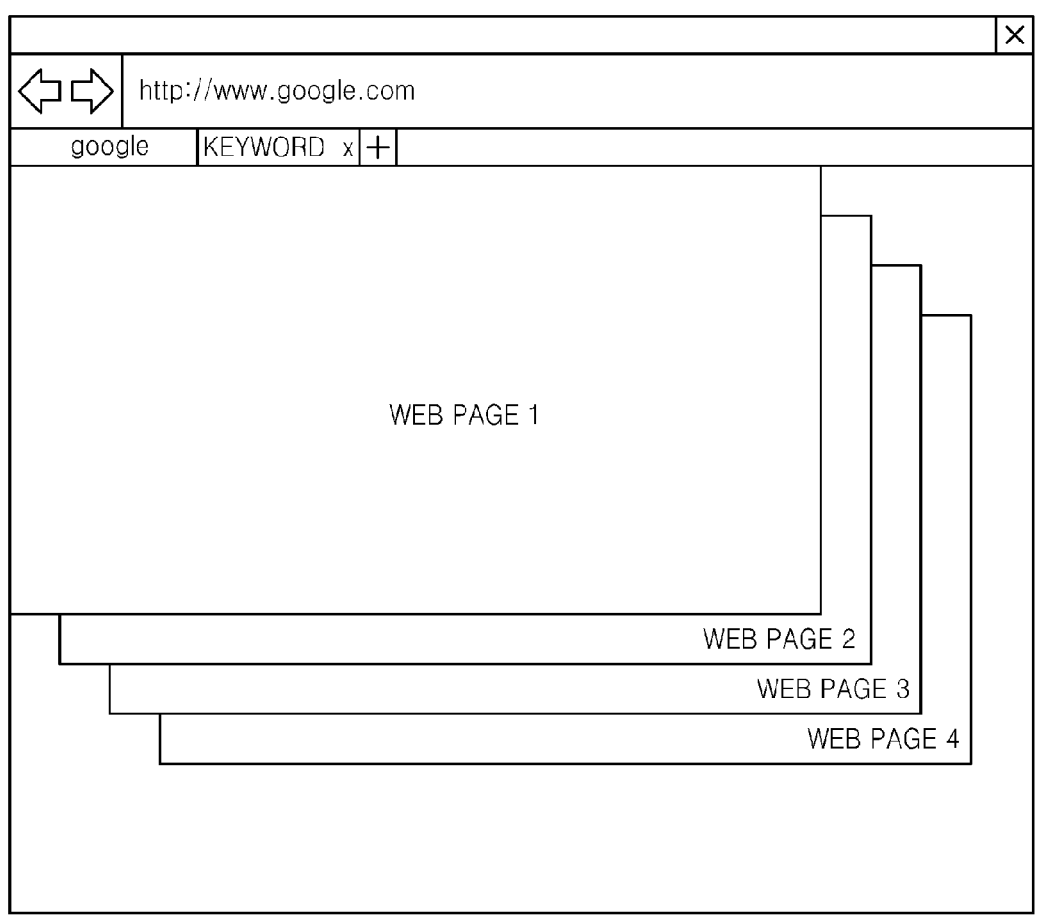

FIGS. 6-9 illustrate examples of activation of grouped web pages, according to embodiments of the present invention and illustrate examples of the grouping of web pages 1-4. FIG. 6 illustrates the activation of web pages 1-4 in a tab format, according to an embodiment of the present invention. FIG. 7 illustrates the activation of web pages 1-4 in a category format or a thumbnail format, according to an embodiment of the present invention. FIG. 8 illustrates the activation of web pages 1-4 in a stack format, according to an embodiment of the present invention. FIG. 9 illustrates the activation of web pages 1-4 in an image division format or an image cascade format, according to an embodiment of the present invention.

In a state in which the grouped web pages are activated, the web pages grouped according to an input signal input through the input unit 101 perform a browser function like a single web page. The input signal includes a browser function control signal.

Specifically, when a browser function control signal is received through the input unit 101, the processor 106 performs a browser function according to the received browser function control signal as if the grouped web pages are one web page. The browser function performed in step S506 will be described in detail with respect to step S1007 of FIG. 10.

When an identification information based web browser function control end signal is received through the input unit 101 in step S507 of FIG. 5, the processor 106 terminates the web browser function control for the grouped web pages. Otherwise, the processor 106 continuously performs the web browser function control for the grouped web pages.

Step S507 may be replaced by an operation of simultaneously closing the grouped web pages by receiving a page closing signal through the input unit 101. When the identification information based web browser function control end signal is received in step S507, the processor 106 proceeds to step S508 and performs an operation according to whether the web browsing end signal is received.

Figure 10:
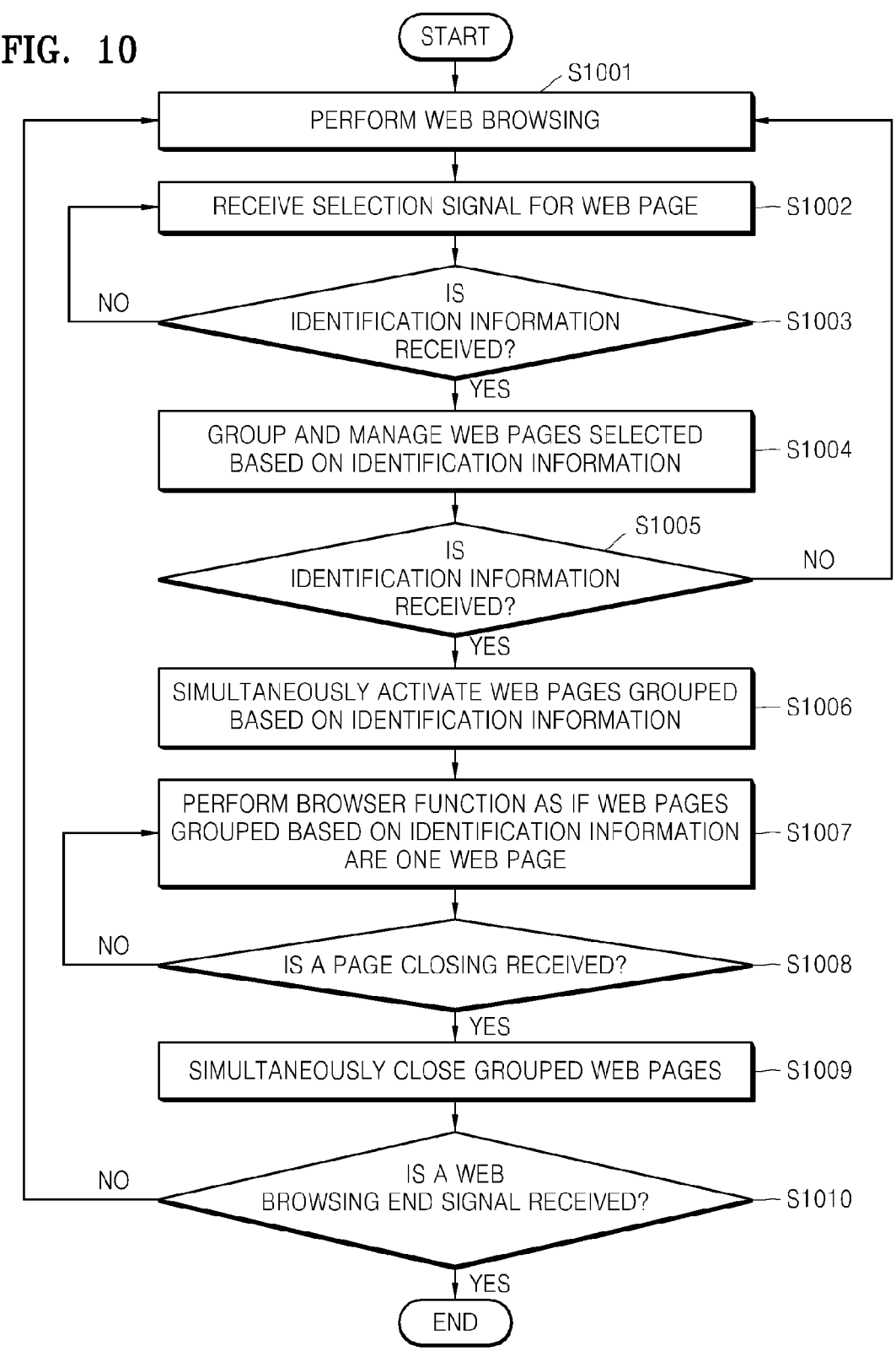
FIG. 10 is a flowchart illustrating a web page management method, according to another embodiment of the present invention.

The processor 106 may perform a web page management method based on the web browser 105 that is loaded, as illustrated in FIG. 10. FIG. 10 is a flowchart illustrating a web page management method, according to another embodiment of the present invention.

In FIG. 10, steps S1006 through S1009 are modified versions of steps S506 and S507 of FIG. 5. Steps S1001 through S1005, and S1010 of FIG. 10 are the same as steps S501 through S505, and S508 of FIG. 5.

In step S1005, when identification information used for grouping of web pages is received through the input unit 101, the processor 106 searches for the grouped web pages based on the identification information and simultaneously activates the grouped web pages, in step S1006. The processor 106 may read information on the grouped web pages stored in the storage unit 107 based on the identification information, and search for the grouped web pages using the read information.

In step S1007, the processor 106 performs a browser function according to a signal input through the input unit 101 as if the grouped web pages are one web page. The activation of a web page may be defined as opening of a web page.

In step S1007, the processor 106 may, for example, add at least one web page to a group or delete at least one web page included in a group according to a signal input through the input unit 101.

Figure 11:
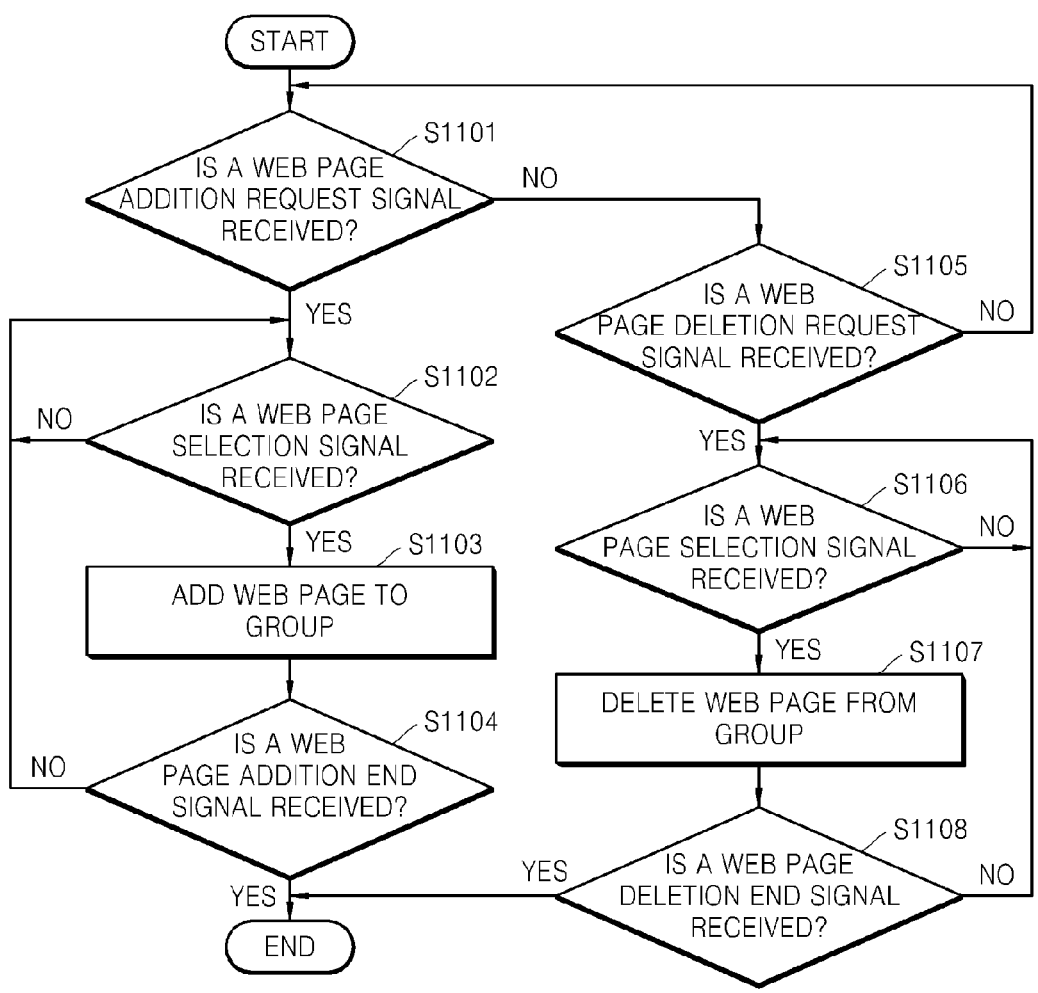
FIG. 11 is a flowchart illustrating an operation of a web browser with respect to addition or deletion of a web page of the grouped web pages, according to an embodiment of the present invention.

FIG. 11 is a flowchart illustrating an operation of a web browser with respect to addition or deletion of a web page of the grouped web pages, according to an embodiment of the present invention. The operations of FIG. 11 may be considered a detailed description of step S506 of FIG. 5 or step S1007 of FIG. 10.

Referring to FIG. 11, when a web page addition request signal is received through the input unit 101 in step S1101 and a web page selection signal is received step S1102, the processor 106 adds a web page selected according to the received selection signal to a group, in step S1103. The web page selection signal in step S1102 may be received according to selection of a user, based on an open web page. When there is a plurality of web page groups, the group to which a web page is added is a web page group that may currently perform a web browser function.

When a web page addition end signal is received through the input unit 101 in step S1104, the processor 106 terminates the addition of a web page to a group. Otherwise, the processor 106 returns to step S1102 and maintains a standby state for receiving another web page selection signal. However, when the web page addition end signal is not received in step S1104, the operation of the processor 106 may be modified in order to maintain the standby state until the web page addition end signal is received.

When a web page addition request signal is not received through the input unit 101 in step S1101, the processor 106 checks whether a web page deletion request signal is received in step S1105. When a web page deletion request signal is received through the input unit 101, the processor 106 checks whether a selection signal for a web page to be deleted is received in step S1106. The selection signal for a web page to be deleted in step S1106 may be received according to selection of a user, based on an open web page group.

When the selection signal for a web page to be deleted is received in step S1106, the processor 106 deletes a web page corresponding to the selection signal from a web page group in step S1107. When a web page deletion end signal is received in step S1108, the processor 106 terminates the web page deletion operation. However, when the web page selection signal is not received in step S1106, the processor 106 maintains a standby state until the web page selection signal is received.

When the web page deletion end signal is not received in step S1108, the processor 106 returns to step S1106 and maintains a standby state for receiving another web page selection signal to be deleted. However, when the web page deletion end signal is not received in step S1108, the operation of the processor 106 may be modified in order to maintain the standby state until the web page deletion end signal is received.

The addition or deletion of a web page in FIG. 11 may be defined as an edition function for a web page included in a group. Also, the order of determining whether to add or delete a web page is not limited to that illustrated in FIG. 11.

Figure 12:
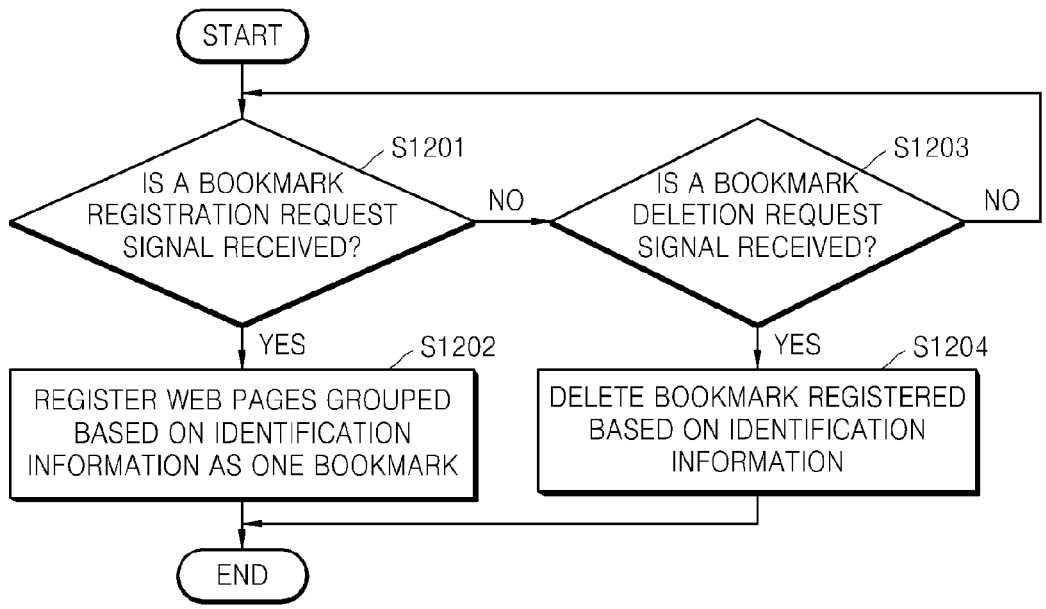
FIG. 12 is a flowchart illustrating an operation of a web browser with respect to register or deletion a bookmark of the grouped web pages, according to an embodiment of the present invention.

When a bookmark registration request signal or bookmark deletion request signal is received through the input unit 101 in step S1007, the processor 106 may perform a web browser function as illustrated in FIG. 12.

FIG. 12 is a flowchart illustrating an operation of a web browser with respect to registration or deletion of a bookmark of the grouped web pages, according to an embodiment of the present invention. The operations of FIG. 12 may be considered a detailed description of step S506 of FIG. 5 or step S1007 of FIG. 10.

When a bookmark registration request signal is received through the input unit 101 in step S1201, the processor 106 registers web pages grouped based on identification information of a web page group as one bookmark, in step S1202.

When it is determined in step S1201 that a bookmark registration request signal is not received through the input unit 101, the processor 106 determines whether a bookmark deletion request signal is received through the input unit 101, in step S1203. When it is determined in step S1203 that the bookmark deletion request signal is received, the processor 106 deletes the registered bookmark based on identification information of a web page group, in step S1204. The order of determining whether the bookmark registration request signal or the bookmark deletion request signal is received is not limited to that illustrated in FIG. 12.

Figure 13:
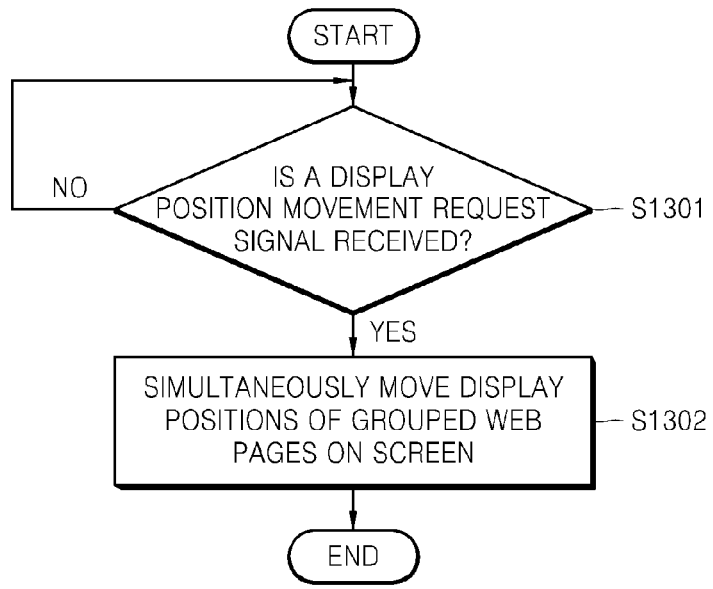
FIG. 13 is a flowchart illustrating an operation of a web browser with respect to movement of display positions of the grouped web pages, according to an embodiment of the present invention.

When a display position movement request signal is received through the input unit 101 in step S1007, the processor 106 may perform a web browser function as illustrated in FIG. 13.

FIG. 13 is a flowchart illustrating an operation of a web browser with respect to movement of display positions of the grouped web pages, according to an embodiment of the present invention. The operations of FIG. 13 may be considered a detailed description of step S506 of FIG. 5 or step S1007 of FIG. 10.

When a display position movement request signal is received through the input unit 101 in step S1301, the processor 106 simultaneously moves display positions of web pages grouped based on identification information of a web page group on a screen, in step S1302.

Figure 14:
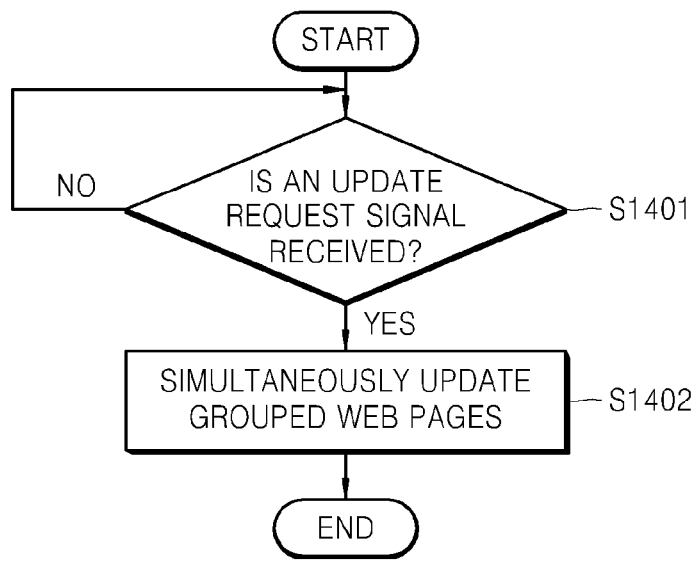
FIG. 14 is a flowchart illustrating an operation of a web browser with respect to an update of the grouped web pages, according to an embodiment of the present invention.

When an update or renewal request signal is received through the input unit 101 in step S1007, the processor 106 may perform a web browser function as illustrated in FIG. 14. FIG. 14 is a flowchart illustrating an operation of a web browser with respect to an update of the grouped web pages, according to an embodiment of the present invention. The operations of FIG. 14 may be considered a detailed description of step S506 of FIG. 5 or step S1007 of FIG. 10.

When an update request signal is received through the input unit 101 in step S1401, the processor 106 simultaneously updates web pages grouped based on identification information of a web page group, in step S1402.

As described above, in step S1007, the processor 106 performs a browser function according to a signal input through the input unit 101 as if the grouped web pages included in a web page group are one web page.

When a page closing signal is received through the input unit 101 in step S1008, the processor 106 simultaneously closes a plurality of web pages included in an activated web page group in step S1009 and proceeds to step S1010 to perform an operation according to whether the web browsing end signal is received, as in step S508 described above.

The storage unit 107 of FIG. 1 may store at least information on the grouped web page and the identification information used for grouping according to the above-described embodiments of the present invention. If there are a plurality of web page groups, the storage unit 107 may store identification information on the web page groups and information on a web page included in each web page group. The storage unit 107 may use a flash memory having a fast access speed, but the storage unit 107 is not limited thereto.

In the above-described embodiments of the present invention, since a plurality of correlated web pages or a plurality of web pages having correlation that is determined by a user may perform a browser function as one web page based on identification information used for grouping the plurality of web pages, correlated web pages of the visited web pages may be quickly and easily accessed.

Figure 15:
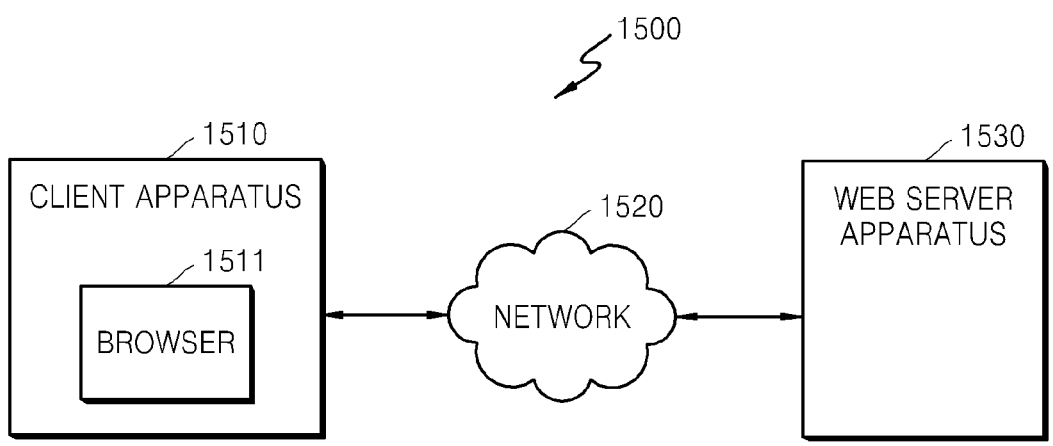
FIG. 15 is a functional block diagram of a server/client system, according to an embodiment of the present invention.

The apparatus 100 of FIG. 1 that is operated according to the above-described FIGS. 2-5 and 10-14 may be applied to a server/client system 1500 of FIG. 15. FIG. 15 is a functional block diagram of the server/client system 1500, according to an embodiment of the present invention.

A client apparatus 1510 including a browser 1511 of FIG. 15 may correspond to the apparatus 100 of FIG. 1. Thus, the client apparatus 1510 may receive web data forming a web page from a web server apparatus 1530 through a network 1520. The browser 1511 of the client apparatus 1510 may form a web page to be displayed based on the received web data so that a user may see the web page.

When the browser 1511 performs web browsing so as to display a web page and a user operating the client apparatus 1510 groups a plurality of web pages based on one identification information, the browser 1511 may perform a web browser function of the web pages grouped based on identification information as a web browser function of one web page.

Accordingly, a user of the client apparatus 1510 may perform a browser function in units of a plurality of web pages having correlation so that a web browser function that may easily access a plurality of correlated web pages may be provided to a user. Also, since the correlation of web pages to be grouped may be dynamically determined according to user's intention or preference, accessibility to a plurality of web pages based on a subject or purpose determined by a user may be improved.

The network 1520 uses a wired or wireless communications network. The web server apparatus 1530 is operated based on a server that may provide a web page.

A program for performing a method of managing a web page according to an embodiment of the present invention can also be embodied as computer readable codes on a computer readable recording medium. The computer readable recording medium is any data storage device that can store data, which can be thereafter read by a computer system. Examples of the computer readable recording medium include, for example, Read-Only Memory (ROM), Random-Access Memory (RAM), CD-ROMs, magnetic tapes, floppy disks, optical data storage devices, etc. The computer readable recording medium can also be distributed over network coupled computer systems so that the computer readable code is stored and executed in a distributed fashion.

While the invention has been shown and described with reference to certain embodiments thereof, it will be understood by those skilled in the art that various changes in form and detail may be made therein without departing from the spirit and scope of the invention as defined by the appended claims.

What is claimed is:

1. A method of managing a web page, the method comprising:

automatically adding all opened web pages to a group after a web page grouping start signal is received and until a web page grouping end signal is received;

generating identification information for collectively identifying a plurality of web pages included in the group, the identification information including first identification information based on a correlation of the plurality of web pages included in the group and second identification information used to identify a web page included in the group, wherein the first identification information includes a search word used for identifying the plurality of web pages and the second identification information includes a web address of the web page;

storing the first and second identification information; and managing the group based on the stored first and second identification information, wherein managing the group comprises registering the group as one bookmark based on the first identification information and the search word when a bookmark registration request signal is received, and wherein the search word is used to identify a group and is used to search among a plurality of groups.

2. The method of claim 1, further comprising performing a browser function with respect to the plurality of web pages based on the first identification information in a same manner as a browser function with respect to a single web page, when the first identification information is received after the plurality of web pages are grouped.

3. The method of claim 1, further comprising:
simultaneously activating the plurality of web pages based on the first identification information when the first identification information is received after the plurality of web pages are grouped; and
simultaneously closing the plurality of web pages when a page close signal is received.

4. The method of claim 3, further comprising performing a browser function with respect to the plurality of web pages in a same manner as a browser function with respect to a single web page until the page close signal is received.

5. The method of claim 1, wherein managing the group further comprises adding at least one web page to the group when a web page addition request signal is received, and deleting at least one web page included in the group when a web page deletion request signal is received.

6. The method of claim 1, wherein managing the group further comprises deleting a registered bookmark based on the first identification information when a bookmark deletion request signal is received.

7. The method of claim 1, wherein managing the group further comprises simultaneously moving display positions of the plurality of web pages on a screen when a display position movement request signal is received based on the first identification information.

8. The method of claim 1, wherein managing the group further comprises simultaneously updating the plurality of web pages when an update request signal is received based on the first identification information.

9. The method of claim 1, wherein the first identification information further includes one of information based on a user's preference, a word indicating a purpose of grouping the plurality of web pages, and information based on the correlation of the plurality of web pages.

10. An apparatus comprising:
a user interface unit for inputting a signal and outputting a web page;
a processor for automatically adding all opened web pages to a group after a web page grouping start signal is received and until a web page grouping end signal is received; generating identification information for collectively identifying a plurality of web pages included in the group, the identification information including first identification information based on a correlation of the plurality of web pages included in the group and second identification information used to identify a web page included in the group, for managing the group based on stored first and second identification information, and for registering the group as one bookmark based on the first identification information and a search word when a bookmark registration request signal is received through the user interface unit; and a storage unit for storing the first and second identification information, wherein the first identification information includes the search word which is used for identifying the web pages and the second identification information includes a web address of the web page, wherein the search word is used to identify a group and is used to search among a plurality of groups.

11. The apparatus of claim 10, wherein, when the first identification information is received after the plurality of web pages are grouped, the processor performs a browser function with respect to the plurality of web pages based on the first identification information in a same manner as a browser function with respect to a single web page.

12. The apparatus of claim 10, wherein the processor simultaneously activates the plurality of web pages based on the first identification information when the first identification information is received after the plurality of web pages are grouped, and simultaneously closes the plurality of web pages when a page close signal is received.

13. The apparatus of claim 12, wherein the processor performs a browser function with respect to the plurality of web pages in a same manner as a browser function with respect to a single web page according to an input signal received through the user interface unit until the page close signal is received.

14. The apparatus of claim 10, wherein the processor adds at least one web page to the group when a web page addition request signal based on the first identification information is received through the user interface unit, and deletes at least one web page included in the group when a web page deletion request signal based on the first identification information is received through the user interface unit, wherein the information on a web page stored in the storage unit is updated when the web page is added or deleted.

15. The apparatus of claim 10, wherein the processor deletes a registered bookmark based on the first identification information when a bookmark deletion request signal is received through the user interface unit.

16. The apparatus of claim 10, wherein the processor simultaneously moves display positions of the plurality of web pages on a screen when a display position movement request signal is received, based on the first identification information, through the user interface unit.

17. The apparatus of claim 10, wherein the processor simultaneously updates the plurality of web pages included in the group when an update request signal is received based on the first identification information through the user interface unit.

18. A non-transitory computer readable recording medium having recorded thereon a program, which when executed implements the steps of:

automatically adding all opened web pages to a group after a web page grouping start signal is received and until a web page grouping end signal is received, generating identification information for collectively identifying a plurality of web pages included in the group, the identification information including first identification information based on a correlation of the plurality of web pages included in the group and second identification information used to identify a web page included in the group, wherein the first identification information includes a search word used for identifying the plurality of web pages and the second identification information includes a web address of the web page;

storing the first and second identification information; and managing the group based on the stored first and second identification information, wherein managing the group comprises registering the group as one bookmark based on the first identification information and the search word when a bookmark registration request signal is received, and wherein the search word is used to identify a group and is used to search among a plurality of groups.

19. The apparatus of claim 10, wherein the first identification information further includes one of information based on a user's preference, a word indicating a purpose of grouping the plurality of web pages, and information based on the correlation of the web pages.

\* \* \* \* \*